United States Patent [19]

Nozu et al.

[11] Patent Number: 4,841,518
[45] Date of Patent: Jun. 20, 1989

[54] CLAMPING MECHANISM FOR INFORMATION RECORDING DISK

[75] Inventors: Shinsaku Nozu; Masao Kase; Masakazu Yamashita, all of Saitama, Japan

[73] Assignee: Pioneer Electronic Corporation, Tokyo, Japan

[21] Appl. No.: 203,831

[22] Filed: Jun. 8, 1988

[30] Foreign Application Priority Data

Aug. 27, 1987 [JP] Japan ............ 62-130799[U]

[51] Int. Cl.$^4$ .............................................. G11B 17/04
[52] U.S. Cl. ................................. 369/270; 360/99.12
[58] Field of Search ................ 369/270, 271; 360/99.12

[56] References Cited

U.S. PATENT DOCUMENTS

| 4,541,086 | 9/1985 | Tanaka | 369/271 |
| 4,570,256 | 2/1986 | Tamaru | 369/271 |
| 4,627,037 | 12/1986 | Tamaru et al. | 369/270 |
| 4,701,901 | 10/1987 | Imai | 369/270 |
| 4,707,751 | 11/1987 | Ozaki et al. | 369/270 |

FOREIGN PATENT DOCUMENTS

| 186195 | 7/1986 | European Pat. Off. | 369/270 |
| 175079 | 10/1984 | Japan | 369/270 |

Primary Examiner—Steven L. Stephan
Attorney, Agent, or Firm—Sughrue, Mion, Zinn Macpeak & Seas

[57] ABSTRACT

A clamp mechanism for clamping an information recording disk such as a compact disk or a video disk to a turntable and which provides a strong and reliable clamping force despite variations in the thicknesses of the disks to be reproduced. The clamp mechanism includes a clamper including a magnet retaining member, a ring-like pressing member arranged to abut the information recording disk, and a plate spring member interconnecting the retaining member and the pressing member in such a manner that the retaining member and the pressing member are vertically movable relative to each other.

5 Claims, 5 Drawing Sheets

CLAMPING MECHANISM FOR INFORMATION RECORDING DISK

BACKGROUND OF THE INVENTION

The present invention relates to a clamping mechanism for clamping an information recording disk such as a compact disk to a turntable during the reproduction of the disk.

Conventionally there has been employed a clamping mechanism of the type shown in FIGS. 1 through 3 of the attached drawings. In these drawings, an information recording disk A, such as a compact disk, has a center hole B. A spindle motor C rotates a spindle D to which a turntable E is fixed.

A centering member F for centering the information recording disk A has a central portion slidably mounted on the spindle D within the turntable E, and an outer circumferential portion in the form of a tapered portion G which can fit within an inner circumferential edge of the center hole of the disk A. The centering member F is urged upward by a compression spring H provided between the centering member F and the turntable C. A magnetic stopper I fixed on the upper end of a column portion of the turntable E prevents the centering member from coming off the spindle D.

A clamper J is provided for pressing and clamping the information recording disk A against the disk carrying surface of the turntable E. As shown in FIGS. 4 through 7, the clamper J is constituted by a pressing member K formed in the shape of an inverted saucer and a ring-like magnet L fixed to the center of the lower surface of the pressing member K. A ring-like pressing member M, which is adapted to be brought into contact with the information disk A, is formed on the outer circumference of the lower surface of the pressing member K, and a shaft hole N into which the spindle D can be inserted is formed in the central portion of the pressing member M. A saucer-like engagement/stopper member O is fixed on the upper surface of the pressing member K, and a circumferential engagement/stopper groove P is formed in the outer circumference between the engagement/stopper member O and the upper surface of the pressing member K. A retaining pawl Q, which is fixed to a vertically movable holder (not shown), engages the circumferential engagement/stopper groove P so that the clamper J is rotatably retained by the holder.

During reproduction, when the information recording disk A is mounted on the disk carrying surface of the turntable E, the center hole B of the disk A fits with the tapered portion G of the centering member F so that the disk A is centered relative to the spindle D. When the clamper J is then lowered by the holder, the magnet L of the clamper J is attracted to the stopper I of the turntable E so that the attraction force acts in such a manner that the pressing member M of the pressing member K of the clamper J urges the information recording disk A against the turntable E, and at the same time the top end portion of the spindle D rotatably fits into the shaft hole N of the clamper J. When the turntable E is then rotated by the spindle motor C, the clamper J rotates together with the information recording disk A.

FIG. 8 shows another conventional clamper J in which clamp shafts S are vertically movably disposed at predetermined circumferential intervals along a circle on a disk retaining member R, and coil springs T urge the respective clamp shafts S downward.

In this case, when a magnet L of the clamper J is attracted to a turntable E, the lower end portions of the clamp shafts S are raised by the attractive force against the elastic force of the respective coil springs T so that an information recording disk is pressed and clamped against the turntable E by the recovery force of the coil springs T.

In the former clamp device, however, there have been various drawbacks in that when the thickness of the information recording disk varies as shown in FIGS. 1 through 3, the gap between the surface of the turntable E and the magnet L varies, whereby the clamping force varies with the variations in the thickness of the disk, making the clamping operation unstable.

In the latter conventional clamp mechanism, on the other hand, while the variations in the clamping force can be eliminated, additional components such as the clamp shafts S and the coil springs T are required, making the total number of parts large. Also, it is necessary to provide space for arranging the clamp shafts S, etc., making the saucer-like retaining member R large in size. Furthermore, because the clamper has sliding portions in the form of the clamp shafts, there are further disadvantages in that the performance of the mechanism tends to deteriorate over time and highly precise components are required.

SUMMARY OF THE INVENTION

Accordingly, it is an object of the present invention to provide a clamp mechanism in which the above-discussed drawbacks of the conventional clamp mechanisms are eliminated.

In accordance with the above and other objects, the invention provides a clamp mechanism having a pressing member for pressing directly an information recording disk and a retaining member for retaining a magnet connected to each other through a plate spring whereby, even if information recording disks to be reproduced vary greatly in thickness, the disks will always be clamped reliably and stably.

DESCRIPTION OF THE PREFERRED EMBODIMENTS

Preferred embodiments of the invention will now be described with reference to FIGS. 9 through 15 of the attached drawings.

Figure 1:
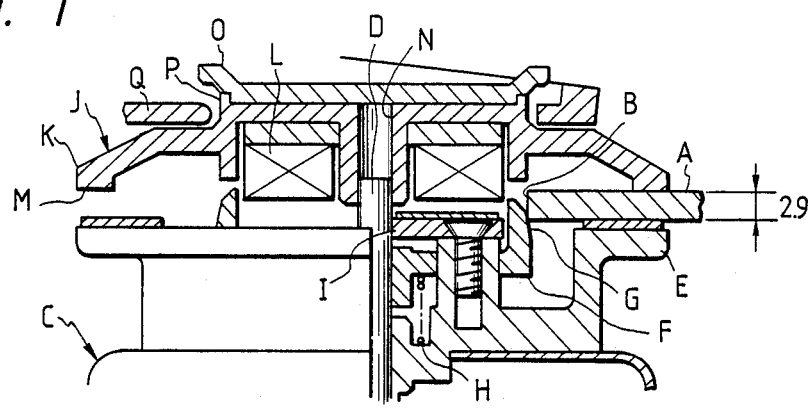
FIGS. 1 through 3 are longitudinal sectional views showing different operations of a conventional clamp mechanism for an information recording disk.
Figure 2:
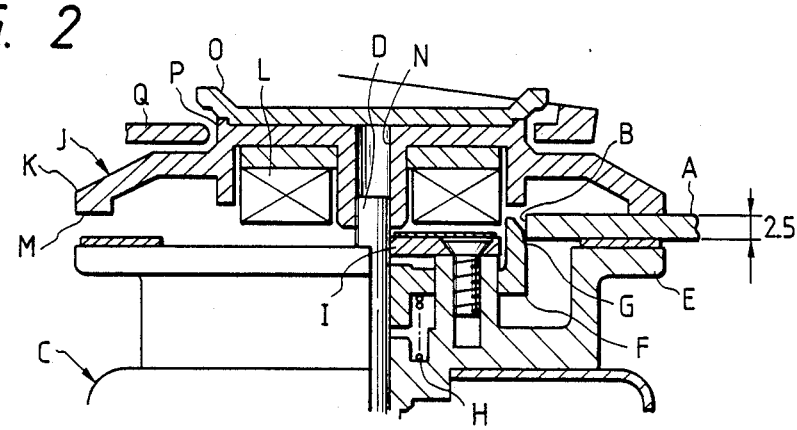
Figure 3:
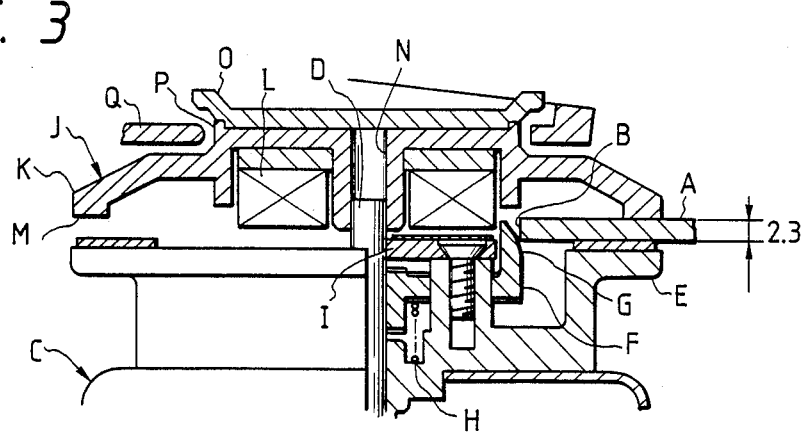
Figure 4:
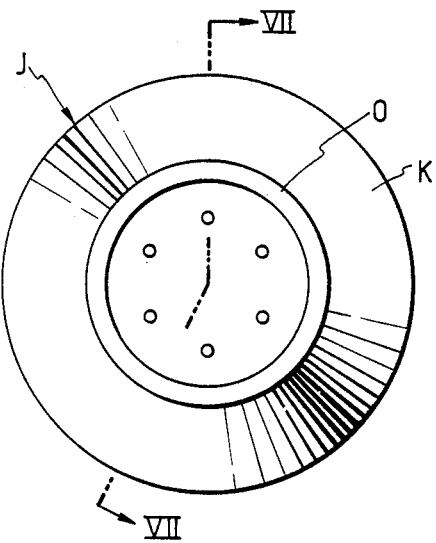
FIG. 4 is a plan view of a clamper used in the clamp mechanism of FIGS. 1 through 3.
Figure 5:
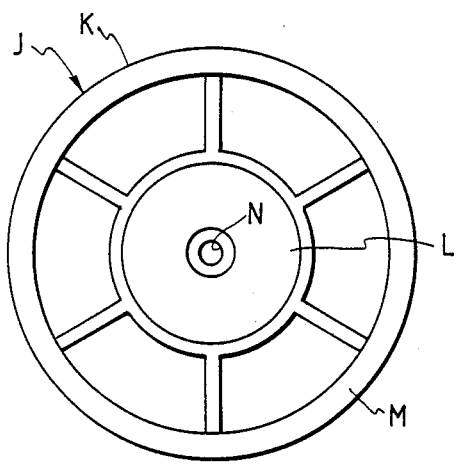
FIG. 5 is a bottom view of the clamper.
Figure 6:
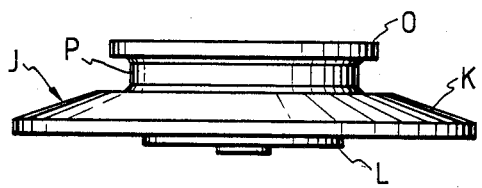
FIG. 6 is a side view of the clamper.
Figure 7:
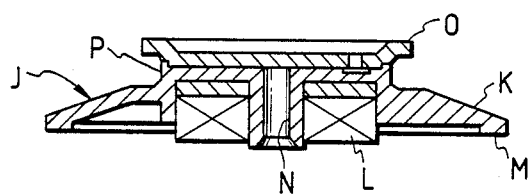
FIG. 7 is a sectional view taken along a line VII—VII in FIG. 4.
Figure 8:
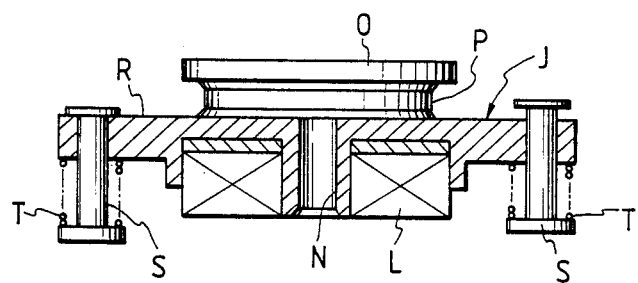
FIG. 8 is a partially cut-away side view of a clamper employed in another conventional clamp mechanism.
Figure 9:
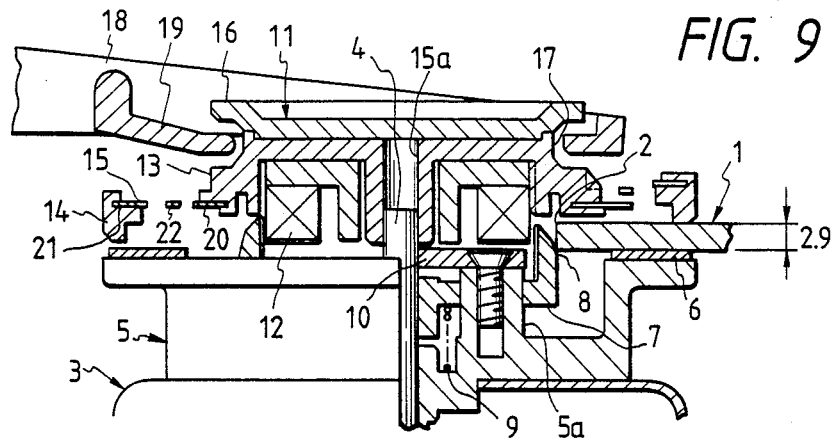
FIGS. 9 through 11 are longitudinal sectional views showing different operations of a clamp mechanism for an information recording disk constructed in accordance with the present invention.
Figure 12:
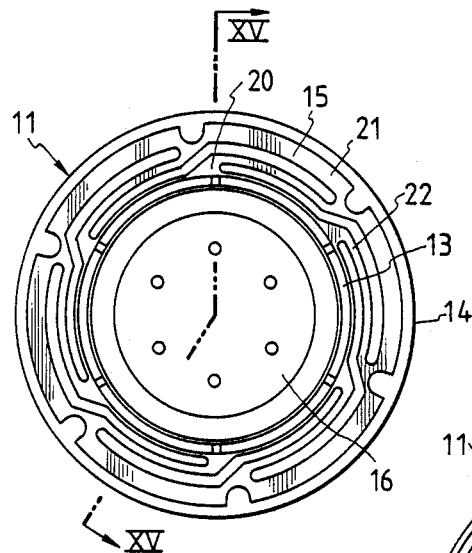
FIG. 12 is a plan view of a clamper used in the clamp mechanism of FIGS. 9 through 11.
Figure 13:
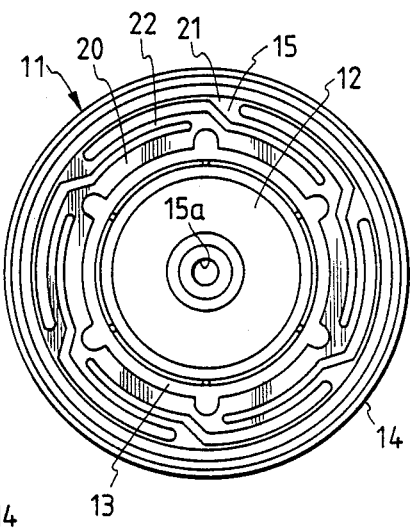
FIG. 13 is a bottom view of the clamper.
Figure 14:
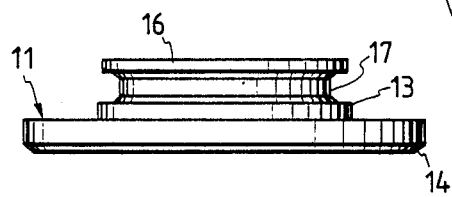
FIG. 14 is a side view of the clamper.
Figure 15:
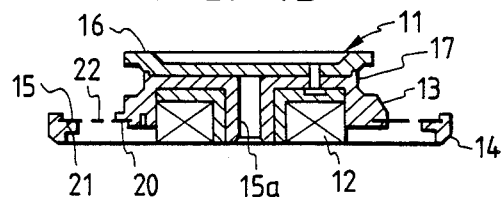
FIG. 15 is a sectional view taken along a line XV—XV in FIG. 12.

FIGS. 9 through 1 are longitudinal sectional views showing different operations of an information recording disk clamp mechanism constructed in accordance with the present invention, FIG. 12 is a plan view of a clamper used in this clamp mechanism, FIG. 13 is a bottom view of the clamper, FIG. 14 is a side view of the clamper, and FIG. 15 is a sectional view taken along a line XV—XV in FIG. 12.

Figure 10:
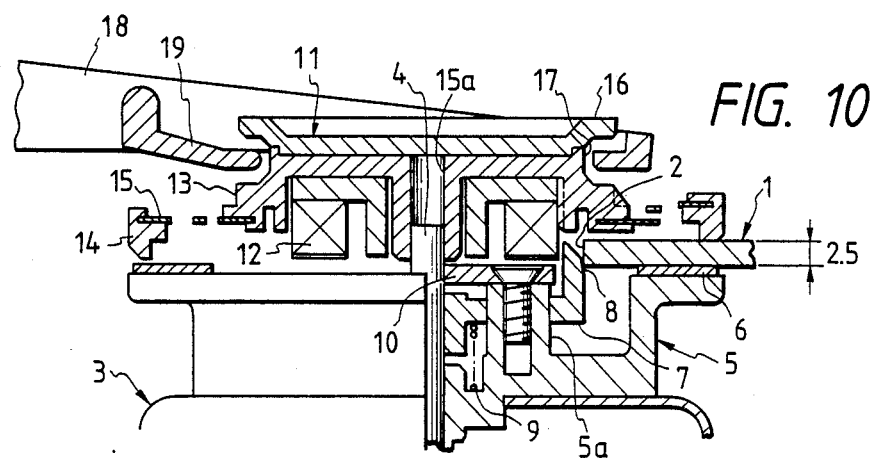
Figure 11:
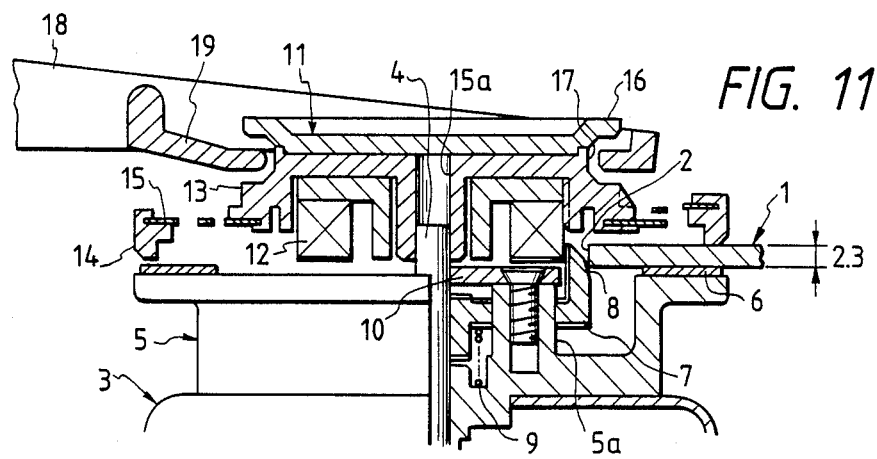

In FIGS. 9 through 11, reference numeral 1 designates an information recording disk such as a compact disk or a video disk, 2 indicates a center hole of the disk 1, 3 a spindle motor driving a spindle 4 to which a central portion of a turntable 5 is fixed, and 6 indicates a rubber sheet adhered to the upper surface of a disk carrying surface of the turntable 5.

A centering member 7 for centering the information recording disk 1 has an outer circumferential portion in the form of a tapered portion 8 which can fit the center hole 2 of the disk 1. A central portion of the centering member 7 is slidably mounted on the spindle 4. The centering member F is urged upward by a centering compression spring 9 provided between the centering member 7 and the turntable 5.

A stopper 10 made of a magnetic material is fixed on an upper end of a column portion 5a of the turntable 5 by screws so as to prevent the centering member 7 from coming off the spindle 4.

A clamper 11 is provided for pressing and centering the information recording disk 1 against the turntable 2. As shown in FIGS. 12 through 15, the clamper 11 is constituted by a retaining member 13 for retaining a ring-like magnet 12, a ring-like pressing member 14 having a diameter larger than that of the retaining member 13, and a plate spring member 15 for concentrically connecting the retaining member 13 and the pressing member 14 to each other so that the members 13 and 14 are movable vertically.

A shaft hole 15a into which the spindle 4 can be inserted is formed in the center of the lower surface of the retaining member 13. The magnet 12 is fixed on the lower surface of the retaining member 13 coaxially with the shaft hole 15a.

A saucer-like engagement/stopper member 16 is fixed on the upper surface of the retaining member 13, and a circular engagement/stopper groove 17 is formed in the outer circumference between the lower surface of the engagement/stopper member 16 and the upper surface of the retaining member 13. A retaining pawl 19 fixed at the rear surface of a vertically movable member 18 engages the circular engagement/stopper groove 17 so that the clamper 11 is mounted at the rear surface of the holder 18 in such a manner as to be rotatable and slightly movable vertically.

The plate spring member 15 is constituted by an inner ring portion 20, an outer ring portion 21, and a plurality of belt-like circumferentially extending spring portions 22 for interconnecting the inner and outer ring portions 20 and 21. The inner ring portion 20 is fixedly embedded in the outer circumferential portion of the retaining member 13, and the outer ring 21 is fixedly embedded in the inner circumference of the pressing member 14.

If the plate spring member 15 is molded with resin integrally with the retaining member 13 and the pressing member 14, it is possible to reduce the total number of parts required.

The operation of the above-described embodiment will now be described.

When the information recording disk 1 is mounted on the turntable 5 for reproduction, the center hole 2 of the disk fits with the tapered portion 8 of the centering member 7 so that the disk 1 is centered relative to the spindle 4 and simultaneously the information recording disk abuts the disk carrying surface of the turntable 5.

When the clamper 11 is then lowered by the holder 18, the magnet 12 of the clamper 11 is attracted to the magnetic stopper 10, that is, to the turntable 5, so that the pressing member 14 of the clamper 11 presses and clamps the information recording disk 1 against the turntable 5, while simultaneously the top end portion of the spindle 4 rotatably fits into the shaft hole 15a of the clamper 11. At that time, the clamper is free from the retaining pawl 19 fixed on the holder 18.

As the turntable 5 is rotated by the spindle motor 3 in the above condition, the clamper 11 rotates together with the information recording disk 1.

As shown in FIGS. 9 through 11, even if the information recording disks vary in thickness, the gap between the lower surface of the magnet 12 and the upper surface of the stopper 10 remains constant. The pressing member 14 pressed by the information recording disk is however moved upward by the elastic transformation of the plate spring member 15 in accordance with the thickness of the information recording disk 1 so that the information recording disk 1 is pressed and clamped against the turntable by the recovery force of the plate spring member 15. The thicker the information recording disk 1, the more strongly is the disk 1 pressed and clamped against the turntable 5.

According to the present invention as described above, in the clamp mechanism for clamping an information recording disk having the clamper 11 arranged to press and clamp the information recording disk 1 against the turntable 5 by means of the attractive force of the magnet 12, the clamper 11 is constituted by the retaining member 13 for retaining the magnet 12, a ring-like pressing member 14 which abuts the information recording disk 1, and a plate spring member 15 for interconnecting the retaining member 13 and pressing member 14 so that the retaining member 13 and the pressing member 14 are vertically movable relative to each other.

With this arrangement, the gap between the turntable 5 and the magnet 12 is therefore held constant so that the magnetic attractive force is constant, even if the thickness of the information recording disk 1 varies considerably. Further, the pressing member 14 pressed by the information recording disk 1 can move vertically due to the elastic transformation of the plate spring member 15 in accordance with the thickness of the information recording disk 1, and the information recording disk 1 is pressed and clamped against the turntable 5 by means of the recovery force of the plate spring member 15 so that the clamping state is stably and reliably maintained. Moreover, the plate spring member 15 may be molded from resin integrally with the retaining member 13 and the pressing member 14 so that the total number of parts can be reduced to thereby reduce the overall cost of the device. Because no sliding portion is required, the reliability over time of the device is maintained.

Furthermore, in a disk reversing operation in a double-sided disk player or the like, the spring force of the centering spring 9 and the weight of the information recording disk 1 will not be sufficiently great to result in separation from the magnet 12 if the elastic force of the plate spring member 15 is appropriate high.

What is claimed is:

1. In a clamp mechanism for clamping an information recording disk having a clamper arranged to press and clamp an information recording disk against a turntable using a magnetic attractive force, the improvement wherein said clamper comprises: a retaining member vertically movable is attracted to said turntable by said magnetic attractive force, a ring-like pressing member having a diameter larger than that of said retaining member arranged to abut said information recording disk, and a plate spring member interconnecting said retaining member in such a manner that said retaining member and said pressing member are vertically movable relative to each other.

2. The clamp mechanism of claim 1, the improvement further comprising a ring-like magnet fixed on a lower surface of said retaining member coaxially with a shaft hole formed in said retaining member.

3. The clamp mechanism of claim 2, wherein the improvement further comprises a saucer-like engagement/stopper member fixed on an upper surface of said retaining member, said saucer-like engagement/stopper member having a circular engagement/stopper groove formed in an outer circumferential portion thereof between a lower surface of said engagement/stopper member and an upper surface of said retaining member, and a fixed retaining pawl engageable with said groove so that said clamper is retained thereby in such a manner as to be rotatable and slightly movable vertically.

4. The clamp mechanism of claim 1, wherein said plate spring member comprises an inner ring portion, an outer ring portion, and a plurality of belt-like circumferentially extending portions connecting said inner and outer ring portions.

5. In a clamp mechanism for clamping an information recording disk having a clamper arranged to press and clamp an information recording disk against a turntable using a magnetic attractive force, the improvement wherein said clamper comprises: a magnet retaining member, a ring-like pressing member arranged to abut said information recording disk, and a plate spring member interconnecting said retaining member and said pressing member in such a manner that said retaining member and said pressing member are vertically movable relative to each other; wherein the improvement further comprises a ring-like magnet fixed on a lower surface of said retaining member coaxially with a shaft hole formed in said retaining member; and a saucer-like engagement/stopper member fixed on an upper surface of said retaining member, said saucer-like engagement/stopper member having a circular engagement/stopper groove formed in an outer circumferential portion thereof between a lower surface of said engagement/stopper member and an upper surface of said retaining member, and a fixed retaining pawl engageable with said groove so that said clamper is retained thereby in such a manner as to be rotatable and slightly movable vertically.

* * * * *